United States Patent
Jurng et al.

(10) Patent No.: US 10,780,414 B2
(45) Date of Patent: Sep. 22, 2020

(54) PROCESS OF MANUFACTURING ADSORBENT FOR REMOVING SILOXANE COMPOUND

(71) Applicant: Korea Institute of Science and Technology, Seoul (KR)

(72) Inventors: Jong-soo Jurng, Seoul (KR); Hyoun-duk Jung, Seoul (KR); Young-haeng Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 141 days.

(21) Appl. No.: 15/933,191

(22) Filed: Mar. 22, 2018

(65) Prior Publication Data
US 2019/0160449 A1 May 30, 2019

(30) Foreign Application Priority Data
Nov. 27, 2017 (KR) .................. 10-2017-0159494

(51) Int. Cl.
*B01J 20/10* (2006.01)
*C01B 33/12* (2006.01)
(Continued)

(52) U.S. Cl.
CPC ............ *B01J 20/103* (2013.01); *B01D 53/02* (2013.01); *B01D 53/04* (2013.01); *B01J 20/28016* (2013.01); *B01J 20/3204* (2013.01); *B01J 20/3221* (2013.01); *B01J 20/3293* (2013.01); *C01B 33/126* (2013.01); *C10L 3/101* (2013.01); *B01D 2253/106* (2013.01);
(Continued)

(58) Field of Classification Search
CPC .............. B01J 20/103; B01J 20/28016; B01J 20/3204; B01J 20/3221; B01J 20/3293; B01D 53/02; B01D 53/04; B01D 2253/31; B01D 2258/05; B01D 2257/55; B01D 2253/106; C01B 33/126; C01P 2002/88; C10L 2290/542; C10L 3/101
See application file for complete search history.

(56) References Cited

U.S. PATENT DOCUMENTS 4,296,000 A * 10/1981 Wason ................ A61K 8/25
423/334
4,312,845 A * 1/1982 Wason ................ A61K 8/25
106/482
(Continued)

FOREIGN PATENT DOCUMENTS

KR 100964633 B1 6/2010

*Primary Examiner* — Anthony J Zimmer
(74) *Attorney, Agent, or Firm* — Hoffmann & Baron, LLP

(57) ABSTRACT

A method of preparing an adsorbent for removing siloxane, in which the method includes mixing a silica particle and an OH compound to bond OH functional groups to the silica particle; measuring percentage by weight of OH bonded to the silica particle; calculating a bonding number and spacing of the OH functional groups by the percentage by weight of OH bonded to the silica particle; performing an evaluation of an adsorption rate and desorption rate of the silica particle to which the OH functional groups, of which the bonding number and spacing are calculated, are bonded; and adjusting the bonding number of the OH functional groups in the silica particle according to the evaluation.

3 Claims, 2 Drawing Sheets
(2 of 2 Drawing Sheet(s) Filed in Color)

(51) Int. Cl.
*B01J 20/28* (2006.01)
*B01J 20/32* (2006.01)
*C10L 3/10* (2006.01)
*B01D 53/04* (2006.01)
*B01D 53/02* (2006.01)

(52) U.S. Cl.
CPC ...... *B01D 2253/31* (2013.01); *B01D 2257/55* (2013.01); *B01D 2258/05* (2013.01); *C01P 2002/88* (2013.01); *C10L 2290/542* (2013.01)

(56) References Cited

U.S. PATENT DOCUMENTS

| | | | |
|---|---|---|---|
| 4,808,233 A * | 2/1989 | Pfannkoch | B01J 41/20 134/2 |
| 7,306,652 B2 | 12/2007 | Higgins | |
| 2013/0228521 A1* | 9/2013 | Guo | B01J 20/28033 210/661 |

\* cited by examiner

PROCESS OF MANUFACTURING ADSORBENT FOR REMOVING SILOXANE COMPOUND

CROSS-REFERENCE TO RELATED APPLICATIONS

This application claims priority to Korean Patent Application No. 10-2017-0159494, filed on Nov. 27, 2017, in the Korean Intellectual Property Office, the disclosure of which is incorporated herein by reference in its entirety.

BACKGROUND

Field

The present disclosure relates to a method of preparing a silica adsorbent for removing siloxane capable of adsorbing and desorbing siloxane and, more specifically, a method of preparing a silica adsorbent and an adsorbent thereby, capable of effectively preparing siloxane at a specific adsorption temperature and desorption temperature by calculating the optimum value of an OH functional group in the silica adsorbent.

Description of the Related Art

Siloxane is one of the process by-products inevitably produced during the preparation of biogas. Siloxane is recognized as an important object to be removed during the biogas production process because it adversely affects the biogas combustor. The biogas refers to a gas including methane as the main ingredient, which is a representative reusable fuel obtained through an anaerobic process with a microorganism or a thermochemical process using a biomass such as straw, corn, sugar cane, or wood waste or using organic waste such as food waste, muck, or sewage sludge. The biogas is a reusable energy source for replacement of a coal fuel, and the use thereof is increased. When the biogas is used as a vehicle fuel, emission of carbon dioxide is lower by about 80% than a gasoline vehicle, and emission of micro dust, nitrogen compounds, and exhaust gas are significantly low. Further, the biogas discharges carbon dioxide to a similar extent to natural gas having a similar component, but since the entire process of generating and destructing carbon dioxide is circulated in the natural system and carbon emission is neutral, a total emission of carbon dioxide may be largely reduced even as compared with any coal fuel which irreversibly emits carbon dioxide in the air.

Accordingly, in order to solve the problem of global warming caused by greenhouse gas, according to Paris agreement established in accordance with the U.N. convention on climate change for reducing the carbon emission quantity, several developed countries including Korea which should rapidly reduce a carbon dioxide emission quantity pay so much attention to the development. However, as described above, the siloxane as a process by-product of the biogas process may be accumulated in a gray scale on the catalyst system for removing contaminants in the exhaust gas and the power generation facility such as a microturbine, a gas turbine, a fuel cell, as well as a gas engine. Thus, it is known to cause an increase in cost and reduce the efficiency of the recycling facilities because of the hindrance of the smooth operation of the equipment, the wear and tear of the parts, the decrease of the output, and the shortening of the oil and parts replacement cycle. Therefore, there is a problem that it is possible to utilize biogas as a fuel for power generation or transportation only when a technology for effectively removing the siloxane is developed.

It is known that conventional techniques for removing siloxane include cooling and chilling, freezing, solvent absorption, adsorption, and the like. The cooling and chilling method and the freezing method have a disadvantage in which they have a high maintenance cost, and a compression and cooling system must be installed even if they are not limited by moisture. Further, although the solvent absorption method has high economic efficiency and enables a large-scale facility, there are issues of explosion hazard of solvent, the occurrence of secondary contaminants, concurrent with adsorption process, and deterioration of efficiency in continuous operation. On the other hand, the adsorption method is advantageous in that the maintenance cost is low and the process is simplified. The adsorption method is a method of selectively removing only the siloxane from the biogas using an adsorbent, such as carbon-based or non-carbon-based adsorbent. In order to remove the siloxane using this adsorption method, an adsorbent with excellent siloxane removal efficiency should be used. Therefore, there is a growing demand for adsorbents having excellent siloxane removal efficiency.

As a method of using an adsorbent, for example, a technique of adsorption method using impregnated activated carbon, such as the carbon-based activated carbon adsorbent in disclosed Korean Patent No. 10-0964633, has been developed, but a scale of an adsorption tower processing facility in a method of holding an adsorbent to be used per year is excessively increased, and a maintenance cost required for replacement of the adsorbent and the like has a large effect on economics of the biogas. In order to address the general issues of the carbon-based activated carbon adsorbent, for example, adsorption and desorption techniques using activated alumina disclosed in U.S. Pat. No. 7,306,652 have been developed, but, in the case of adsorbing the siloxane compounds, there are disadvantages that the reproduction thereof is not easy and the economics is deteriorated due to requirement of chemical process and so on for reproducing. Further, a high adsorption rate and desorption rate should be exhibited at the optimum operating temperature of the biogas production and siloxane removal system when using an adsorbent, but the conventional adsorbent has a disadvantage in that it is necessary to adjust the temperature separately because it is difficult to adsorb and desorb at the operating temperature of the system, or it is simple-adsorbed and intended to be used once.

RELATED ART DOCUMENT

Patent Document

Patent Document 0001: Korean Patent. No.: 10-0964 633
Patent Document 0002: U.S. Pat. No. 7,306,652

SUMMARY

An object of the present disclosure is to provide a method of preparing an adsorbent which can be repetitively used by easily regenerating the same and efficiently removing a siloxane compound included in a biogas that causes a problem such as engine abrasion during gas turbine power generation at one time.

To this end, a method of preparing an adsorbent for removing siloxane according to the present disclosure is proposed to provide a method of preparing an adsorbent being capable of adjusting the number of OH functional groups and spacing between the respective OH functional groups which are required to be bound to the adsorbent so as to exhibit optimal adsorption and desorption performance at the operating temperature of the system.

A method of preparing an adsorbent for removing siloxane according to the present disclosure is configured to include the steps of: 1) mixing a silica particle and an OH compound to bond OH functional groups to the silica particle; 2) measuring percentage by weight of OH bonded to the silica particle; 3) calculating the bonding number and spacing of the OH functional groups by the percentage by weight of OH bonded to the silica particle; 4) performing an evaluation of an adsorption rate and desorption rate of the silica particle to which the OH functional groups, of which the bonding number and spacing is calculated, are bonded; and 5) adjusting the bonding number of the OH functional groups in the silica particle according to the evaluation of step 4.

Here, a method of measuring the percentage by weight of OH bonded to the silica particle of step 2 is a thermogravimetric analysis (TGA), and the bonding number and spacing of the OH functional groups of step 3 are calculated by the following formula 1:

$$OH/nm^2 = a \times \frac{(OH/nm^2)_{T2} \times SSA \times wt_{T2} + \left[\frac{(wt_{T1} - wt_{T2})}{MW_{H2O}} \times 2\right]}{SSA \times wt_{T1}}$$ [Formula 1]

Further, in an adsorbent for removing siloxane according to the present disclosure, a silica particle includes 5 to 10 OH groups per unit area (nm$^2$) of the adsorbent, and an adsorption rate is 99% or more at an adsorption temperature of 25° C. to 50° C. and a desorption rate is 99% or more at a desorption temperature of 120° C. to 150° C. for a siloxane compound.

Here, the OH groups bonded to the silica particle have a spacing of 2 Å to 5 Å.

The silica adsorbent according to the present disclosure can be reproduced by desorption, which is broken from the conventional disposable adsorbent so that it can be continuously used. To this end, the silica adsorbent according to the present disclosure is configured to optimize the number and spacing of the hydroxyl groups introduced onto the surface of the silica particles, thereby controlling the adsorption and desorption performance of the siloxane compound according to the temperature change, thereby having an effect that the economic efficiency can be ensured under the optimum condition depending on the adsorption and desorption.

In particular, the silica adsorbent according to the present disclosure has an effect that a user may operate a system capable of removing siloxane under his or her desired temperature condition by adjusting the adsorption and desorption temperature necessary for the operation of the siloxane removal system.

BRIEF DESCRIPTION OF THE DRAWINGS

The patent or application contains at least one drawing executed in color. Copies of this patent or patent application publication with color drawing(s) will be provided by the U.S. Patent and Trademark Office upon request and payment of the necessary fee.

The above and other aspects, features and other advantages of the present disclosure will be more clearly understood from the following detailed description taken in conjunction with the accompanying drawings, in which.

DETAILED DESCRIPTION OF THE PREFERRED EMBODIMENT

Figure 1:
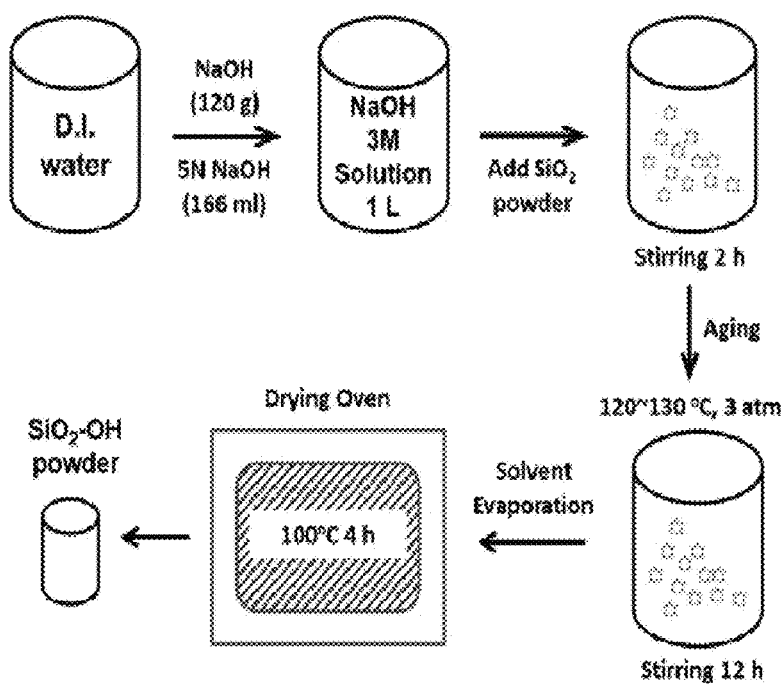
FIG. 1 illustrates a process of producing an adsorbent according to the present disclosure.

Hereinafter, the technical configuration of the method of preparing an adsorbent for removing siloxane according to the present disclosure will be described with reference to the accompanying drawings.

It will be understood that the terms such as "include," "have," or "comprise" in this specification, specify the presence of stated features, numbers, steps, components, parts, or combinations thereof, but do not preclude the possibility of presence or addition of one or more other features, numbers, steps, operations, elements, components, parts, or combinations thereof.

Further, unless otherwise defined, all terms used herein, including technical or scientific terms, have the same meanings as those generally understood by those with ordinary knowledge in the field of the art to which the present disclosure belongs. Such terms as those defined in generally used dictionaries are to be interpreted as having meanings equivalent to the contextual meanings in the relevant field of art and are not to be interpreted as having ideal or excessively formal meanings unless clearly defined as having such meanings in the present application.

The method of preparing an adsorbent for removing siloxane according to the present disclosure is essentially configured to include the steps of: 1) mixing a silica particle and an OH compound to attach OH functional groups to the silica particle; 2) measuring percentage by weight of OH groups bonded to the silica particle; 3) calculating the bonding number and spacing of the OH functional groups by the percentage by weight of OH groups bonded to the silica particle; 4) performing an evaluation of an adsorption rate and desorption rate of the silica particle to which the OH functional groups, of which the bonding number and spacing is calculated, are bonded; and 5) adjusting the bonding number of the OH functional groups in the silica particle according to the evaluation of step 4.

As described above, in the present disclosure, the silica adsorbent is used in order to remove the siloxane compound, and the adsorbent is configured in a form in which a hydroxyl group is introduced onto the surface of the silica particle. In this connection, the silica adsorbent may optimize the number of hydroxyl groups and spacing between the hydroxyl groups, introduced onto the surface of the silica particle so as to increase the adsorption efficiency of the siloxane compound and to easily control adsorption and desorption of the siloxane compound according to temperature changes.

In order to attach the OH functional groups to the silica particle in step 1 of the method of preparing the adsorbent for removing siloxane according to the present disclosure, it is easy to use a hydrothermal synthesis method using the silica particle and sodium hydroxide as reactants in terms of the number and spacing of the OH functional groups introduced onto the surface of the silica particle. The silica particle is generally used in the field of adsorbents and preferably has a particle diameter of 0.5 mm to 5 mm. When the particle diameter is less than 0.5 mm, the pressure loss may occur. When the particle diameter exceeds 5 mm, the problem of passing through the adsorption bed may occur. It is preferable to use 0.5 moles to 5 moles of sodium hydroxide per 1 mole of the silica particle.

FIG. 1 illustrates a process for preparing the adsorbent for removing siloxane by introducing the OH functional group onto the surface of the silica particle in step 1 (in the method of preparing the adsorbent for removing siloxane according to the present disclosure), in which the silica particle is dispersed in an aqueous NaOH solution, thereby preparing the OH functional group-introduced silica adsorbent through hydrothermal synthesis. With a specific description of the process, NaOH is dissolved in distilled water to prepare an aqueous solution. Then, the silica particle is immersed in the solution, stirred at 120° C. to 130° C. for 12 hours under a pressure of 3 atm, and dried at 100° C. for 4 hours, thereby preparing the OH functionalized silica adsorbent.

Example 1

After the $SiO_2$ powder was immersed in 1 L of a 3M NaOH solution and stirred for 2 hours, the mixture was stirred at 120° C. to 130° C. under a pressure of 3 atm for 12 hours. Thereafter, the mixture was dried at 100° C. for 4 hours to prepare $SiO_2$—OH particles.

For the performance of the silica adsorbent for removing siloxane prepared through the preparing process as illustrated in FIG. 1 as described above, the adsorption and desorption performance are affected depending on how much OH functional groups are attached to the silica adsorbent. Therefore, the step 2 of measuring the percentage by weight of the OH functional groups bonded to the silica particle and the step 3 of calculating the number and spacing of the OH functional groups through the percentage by weight of the OH groups bonded to the silica particle are important in the method of producing the adsorbent for removing siloxane according to the present invention. It is important to accurately measure the amount of OH functional groups bound to the adsorbent, as described above. When it is measured, the optimum OH functional groups may be adjusted to be available at the operating temperature of the system for removing siloxane. For this purpose, the silica adsorbent for removing siloxane, according to the present disclosure, prepared through the preparing process as illustrated in FIG. 1 may be analyzed through a thermogravimetric analysis (TGA) to measure the bonding number and spacing of OH functional groups introduced onto the silica particle and to calculate the optimal value at specific temperature. In the TGA used in the present disclosure, the weighing scale is combined with the heating furnace, and the sample is put in the furnace and is heated. While the sample is heated, the change in the weight of the sample per hour is measured. The TGA results are expressed in a normalized weight. In order to calculate the number of OH functional groups from the weight percentage per unit nm area, a calculation formula such as the formula 1 is required. In the formula 1, the number of OH groups is converted with respect to the amount of silanol groups. "SSA" refers to a specific surface area, $wt_{T1}$ is the weight reduction from room temperature to 120° C. in Step 1 on the TGA analysis, "$wt_{T2}$" is the weight reduction from 120° C. to 800° C. in Step 2 on the TGA analysis, "NA" refers to Avogadro's constant, and "$MW_{H2O}$" refers to the molecular weight of $H_2O$, and "a" is a calibration factor derived from experiment or experience.

$$OH/nm^2 = a \times \frac{(OH/nm^2)_{T2} \times SSA \times wt_{T2} + \left[\frac{(wt_{T1} - wt_{T2})}{MW_{H2O}} \times 2\right]}{SSA \times wt_{T1}}$$

Example 2

Figure 2:
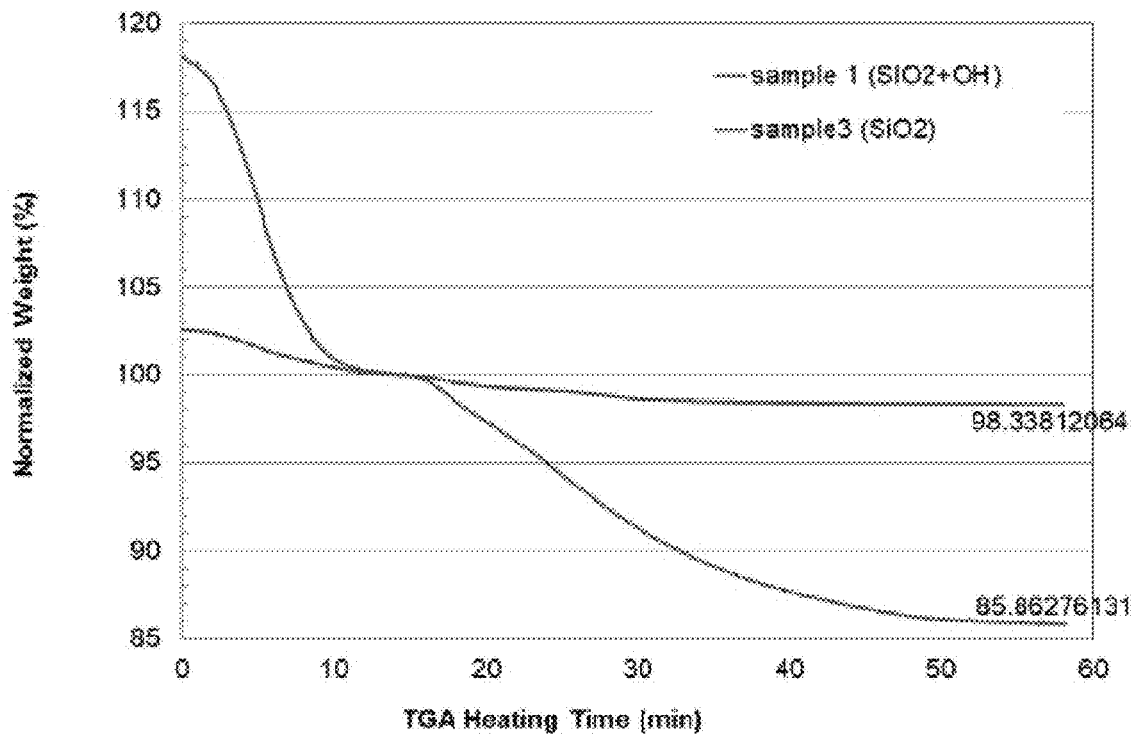
FIG. 2 illustrates results of the thermogravimetric analysis (TGA) for an adsorbent according to the present disclosure.

$SiO_2$—OH particles were prepared using 0 moles to 5 moles of NaOH according to Example 1, and TGA was performed on the $SiO_2$—OH particles. Here, TGA was carried out under a condition of a temperature range of from room temperature to 800° C. for a heating time of 0 minutes to 60 minutes. TGA was performed on $SiO_2$ without OH bonding and OH-bound $SiO_2$—OH. FIG. 2 illustrates TGA results for $SiO_2$ without OH bonding and OH-bound $SiO_2$—OH according to the present disclosure. $SiO_2$ without OH bonding showed 98% by weight at a heating time of 55 minutes, while $SiO_2$—OH showed 98, 94, 89, and 85% by weight, respectively, in the same heating time of 55 minutes depending on 0.5 moles, 1 mole, 2 moles, and 3 moles or more of NaOH. At the heating time of 55 minutes, 98, 94, 89, and 85% by weight, respectively refer to the number of OH functional groups, 02, 07, 12, and 16 according to the formula 1.

When the OH functional groups are bound to the silica particles as described above, the weights of the OH functional groups bound to the silica surface are measured by TGA, the bonding number and distance between the OH functional groups may be calculated according to the formula 1, and step 4 is required to evaluate the adsorption rate and the desorption rate of the silica particles to which the OH functional groups are bound, in which the bonding number and spacing of OH functional groups are calculated. Such process may optimize the number of functional group required for adsorption and desorption at the optimum operating temperature.

In this regard, it is generally advantageous for the silica adsorbent to adsorb siloxane compounds at 25° C. to 60° C., and to desorb the siloxane compounds at 100° C. to 150° C. If possible, it is important to configure the bonding number and distance of OH functional groups, which are capable of adsorption and desorption in a range of the normal temperature of the biogas production system. In the present disclosure, the number and percentage by weight of OH functional groups and the amount of siloxane adsorbed according to the number and distance were evaluated at an adsorption temperature of 25° C. in order to obtain the optimum values as described above.

Example 3

Adsorption capacities were evaluated at 25° C. for $SiO_2$ and $SiO_2$—OH, in which the number of OH groups is 10 to 16 at heating time of 55 minutes in TGA. The adsorption capacity was measured with a weight of 1 g of the adsorbent using a ¼" reaction tube with a flow rate of 100 ml/min for a siloxane compound, decamethylcyclopentasiloxane (D5).

Figure 3:
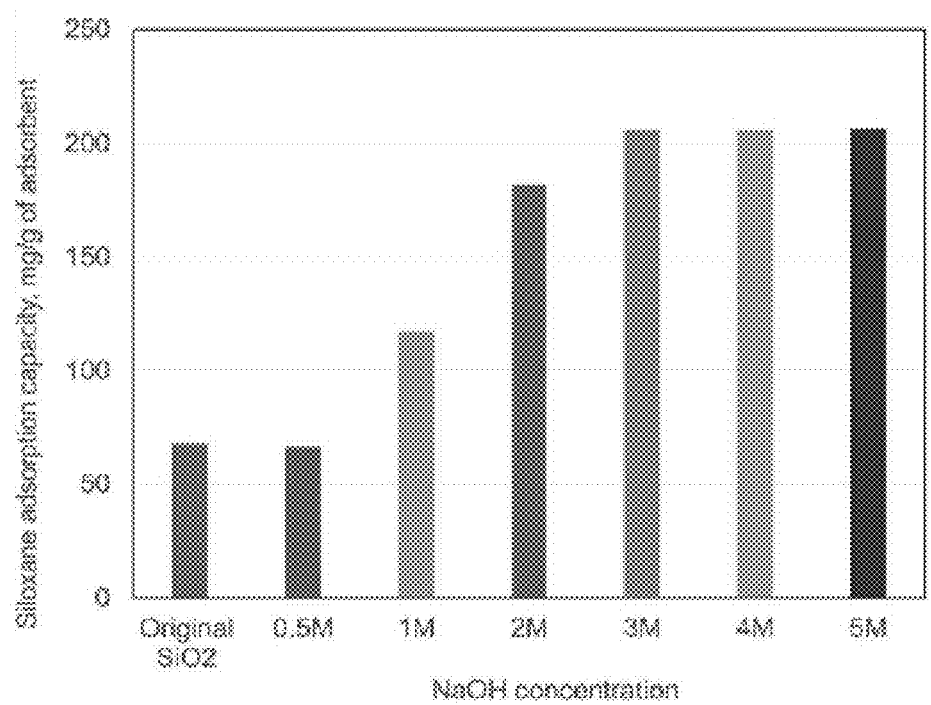
FIG. 3 illustrates the siloxane removal effect according to the number of OH groups of an adsorbent according to the present disclosure.
Figure 4:
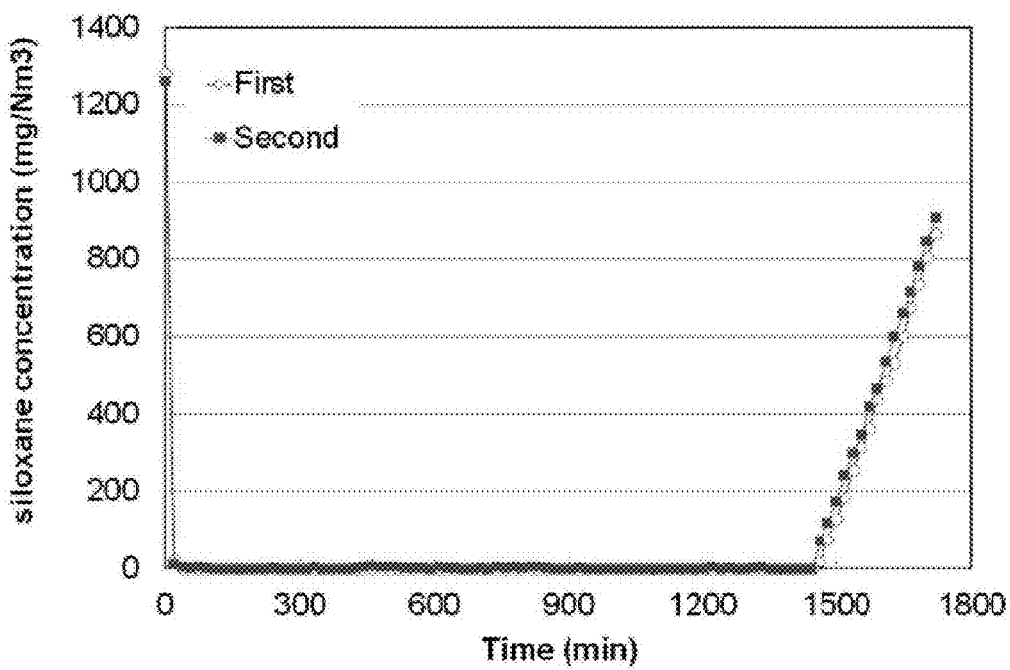
FIG. 4 illustrates the siloxane desorption effect according to the number of OH groups of an adsorbent according to the present disclosure.

FIG. 3 shows the effect of removing the siloxane depending on the number of OH groups of the adsorbent according to the present disclosure. As a result of evaluation of adsorption amount in Example 3, the adsorption amount at 25° C. to 60° C. was optimized at 10 OH/nm$^2$ to 16 OH/nm or more of the number of OH groups. In order to evaluate the desorption performance at the adsorption performance as described above, desorption performance was evaluated at 6 to 12 of the number of OH groups at a temperature of 120° C. The desorption performance was evaluated by desorbing and regenerating the siloxane and by reabsorbing the siloxane immediately after desorption while blowing nitrogen gas at a temperature of 120° C. As a result of the evaluation, the regeneration (desorption) was shown to be excellent at a desorption temperature of 120° C. to 150° C. and the number of OH groups of 6 OH/nm$^2$ to 11 OH/nm$^2$ as illustrated in FIG. 4, in which the regeneration (desorption) according to the number of OH groups of the adsorbent according to the present disclosure is shown.

When it is required to adjust the bonding number of OH functional groups to the silica particles according to the evaluation of step 4, the bonding number of OH functional groups which are bonded to the silica particles can be adjusted by mixing the silica particles and the OH compound so that the OH functional groups are attached to the silica particles as the step 1.

Although, as described above, the present disclosure has been described with reference to embodiments, it will be understood that various changes and modifications may be made by those skilled in the art. These changes and modifications may belong in the scope of the present disclosure as long as those do not depart from the scope of the technical concept provided by the present disclosure. Accordingly, the scope of the present disclosure should be determined by the following claims.

What is claimed is:

1. A method of preparing an adsorbent for removing siloxane, the method comprising:

mixing a silica particle and an OH compound to attach OH functional groups to the silica particle;

measuring percentage by weight of OH bonded to the silica particle;

calculating a bonding number and spacing of the OH functional groups by the percentage by weight of OH bonded to the silica particle;

performing an evaluation of an adsorption rate and desorption rate of the silica particle to which the OH functional groups, of which the bonding number and spacing is calculated, are bonded, in respect of siloxane, at a temperature of 25° C. to 60° C.; and adjusting the bonding number of the OH functional groups on the silica particle according to the evaluation to a mixing ratio of the silica particle and the OH compound according to an operating temperature of a system for removing siloxane.

2. The method of claim 1, wherein the percentage by weight of OH bonded to the silica particle is measured via thermogravimetric analysis (TGA).

3. The method of claim 1, wherein the bonding number and spacing of the OH functional groups are calculated by $$OH/nm^2 = a \times \frac{(OH/nm^2)_{T2} \times SSA \times wt_{T2} + \left[\frac{(wt_{T1} - wt_{T2})}{MW_{H2O}} \times 2\right]}{SSA \times wt_{T1}},$$

wherein "nm" is a unit of area, "SSA" is a specific surface area, "$wt_{T1}$" is the weight reduction from room temperature to 120° C. in Step 1 on thermogravimetric analysis (TGA), "$wt_{T2}$" is the weight reduction from 120° C. to 800° C. in Step 2 on TGA, "NA" is Avogadro's constant, "$MW_{H2O}$" is a molecular weight of H$_2$O, and "a" is a calibration constant.

* * * * *